US008027996B2

(12) United States Patent
Barsness et al.

(10) Patent No.: US 8,027,996 B2
(45) Date of Patent: Sep. 27, 2011

(54) COMMITMENT CONTROL FOR LESS THAN AN ENTIRE RECORD IN AN IN-MEMORY DATABASE IN A PARALLEL COMPUTER SYSTEM

(75) Inventors: Eric Lawrence Barsness, Pine Island, MN (US); Amanda Peters, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 11/947,009

(22) Filed: Nov. 29, 2007

(65) Prior Publication Data

US 2009/0144337 A1 Jun. 4, 2009

(51) Int. Cl.
*G06F 7/00* (2006.01)
*G06F 17/30* (2006.01)

(52) U.S. Cl. .................. 707/792; 707/796; 711/108

(58) Field of Classification Search .................. 707/200, 707/612, 613, 764, 790, 802, 999.202, 999.102, 707/792; 711/108
See application file for complete search history.

(56) References Cited

U.S. PATENT DOCUMENTS

| 5,418,957 | A | * | 5/1995 | Narayan | 717/113 |
| 5,452,445 | A | * | 9/1995 | Hallmark et al. | 707/2 |
| 5,561,797 | A | * | 10/1996 | Gilles et al. | 707/8 |
| 5,687,369 | A | | 11/1997 | Li | |
| 5,740,408 | A | * | 4/1998 | Bonne et al. | 703/22 |
| 5,802,303 | A | | 9/1998 | Yamaguchi | |
| 5,819,083 | A | | 10/1998 | Chen et al. | |
| 5,937,402 | A | | 8/1999 | Pandit | |
| 5,970,495 | A | * | 10/1999 | Baru et al. | 707/102 |
| 6,363,401 | B2 | * | 3/2002 | Yahya et al. | 707/10 |
| 6,377,950 | B1 | * | 4/2002 | Peters et al. | 707/10 |
| 6,457,021 | B1 | * | 9/2002 | Berkowitz et al. | 707/999.008 |
| 6,457,085 | B1 | * | 9/2002 | Reddy | 710/305 |
| 6,604,103 | B1 | | 8/2003 | Wolfe | |
| 6,625,141 | B1 | * | 9/2003 | Glitho et al. | 370/352 |
| 7,000,141 | B1 | | 2/2006 | Karlsson et al. | |
| 7,080,139 | B1 | * | 7/2006 | Briggs et al. | 709/224 |
| 7,243,112 | B2 | * | 7/2007 | Qu et al. | 707/104.1 |

(Continued)

OTHER PUBLICATIONS

Watson et al., "The System Management of the ICL GOLDRUSH Parallel Database Server", Technical Report: NEWCASTLE-CS#TR96-548, Year of Publication: 1996, accessed online at <http://www.cs.ncl.ac.uk/publications/inproceedings/papers/660.pdf> on Feb. 13, 2009.

(Continued)

*Primary Examiner* — Yicun Wu
*Assistant Examiner* — Pavan Mamillapalli
(74) *Attorney, Agent, or Firm* — Martin & Associates, LLC; Derek P. Martin (57) ABSTRACT

In a networked computer system that includes multiple interconnected nodes, a commitment control mechanism allows designating certain portions of a record in an in-memory database as mandatory and other portions of the record as secondary, and performs mandatory commitment control once all the mandatory portions are available even if one or more secondary portions are not yet available. The secondary portions may be under separate commitment control that is asynchronous to the commitment control for the mandatory portions, or may be under no commitment control at all. The result is a commitment control mechanism that performs commitment control for portions of a record that are marked mandatory even when one or more of the portions marked secondary are not available.

19 Claims, 7 Drawing Sheets

U.S. PATENT DOCUMENTS

| | | | |
|---|---|---|---|
| 7,263,695 | B1 | 8/2007 | Muzaffar et al. |
| 7,328,176 | B2 * | 2/2008 | Tarvydas et al. ............... 705/26 |
| 7,433,874 | B1 | 10/2008 | Wolfe |
| 7,448,035 | B2 * | 11/2008 | Dorrance et al. ............ 718/101 |
| 7,526,493 | B2 * | 4/2009 | Betts et al. ................ 707/999.1 |
| 7,640,451 | B2 * | 12/2009 | Meyer et al. ..................... 714/4 |
| 7,664,799 | B2 * | 2/2010 | Mukherjee et al. .... 707/999.205 |
| 2002/0087500 | A1 * | 7/2002 | Berkowitz et al. ................ 707/1 |
| 2002/0129115 | A1 | 9/2002 | Noordergraaf et al. |
| 2002/0184239 | A1 * | 12/2002 | Mosher et al. ................ 707/200 |
| 2003/0072263 | A1 | 4/2003 | Peterson |
| 2004/0107381 | A1 | 6/2004 | Bomfim et al. |
| 2005/0080796 | A1 | 4/2005 | Midgley |
| 2006/0040711 | A1 | 2/2006 | Whistler |
| 2007/0088970 | A1 * | 4/2007 | Buxton et al. .................... 714/2 |
| 2007/0208686 | A1 * | 9/2007 | Gupta et al. ...................... 707/1 |
| 2007/0220059 | A1 | 9/2007 | Lu et al. |
| 2007/0239661 | A1 * | 10/2007 | Cattell et al. ...................... 707/2 |
| 2007/0239790 | A1 * | 10/2007 | Cattell et al. ................. 707/200 |
| 2007/0288537 | A1 * | 12/2007 | Bourbonnais et al. ........ 707/204 |
| 2007/0288900 | A1 * | 12/2007 | Lev et al. ...................... 717/124 |
| 2008/0027920 | A1 | 1/2008 | Schipunov et al. |
| 2008/0040561 | A1 | 2/2008 | Bryant |
| 2008/0163222 | A1 * | 7/2008 | Bourbonnais et al. ........ 718/101 |

OTHER PUBLICATIONS

Dempster et al., "A Tool for Supporting the Teaching of Parallel Database Systems", IEEE Transactions on Education, vol. 48, No. 2, May 2005, pp. 238-247, accessed online at <http://ieeexplore.ieee.org/ielx5/13/30826/01427873.pdf?arnumber=1427873> on Feb. 13, 2009.

Hua et al., "Including the Load Balancing Issue in the Optimization of Multi-way Join Queries for Shared-Nothing Database Computers", IEEE, 1993, pp. 74-83, accessed online at <http://ieeexplore.ieee.org/stamp/stamp.jsp?arnumber=00253068> on Aug. 4, 2009.

Hua et al., "Dyanmic Load Balancing in Very Large Shared-Nothing Hypercube Database Computer", IEEE 1993, pp. 1425-1439, accessed online at <http://ieeexplore.ieee.org/stamp/stamp.jsp?arnumber=00260633>on Aug. 4, 2009.

Sokolinsky, L.B., "Organization of Parallel Query Processing in Multiprocessor Database Machines with Hierarchical Architecture", Programming and Computer Software, vol. 27, No. 6, 2001, pp. 297-308, accessed online at <http://www.springerlink.com/contentlr55x564303787918/fulltext.pdf> on Aug. 4, 2009.

Hirano et al., "Load Balancing Algorithms for Parallel Database Processing on Shared Memory Multiprocessor", IEEE, 1991, pp. 210-217, accessed online at <http://ieeexplore.ieee.org/stamp/stamp.jsp?tp=&arnumber=183105&isnumber=4715> on Aug. 4, 2009.

* cited by examiner

| Table A | | | | | |
|---|---|---|---|---|---|
| CreditCard# (int20) M | Total (int10) M | Date (date10) M | Location (char25) M | CustName (char40) S | Comment (char100) S |
| | | | | | |
| | | | | | |
| | | | | | |
| | | | | | |

| Table A | | | | | |
|---|---|---|---|---|---|
| CreditCard# (int20) M | Total (int10) M | Date (date10) M | Location (char25) M | CustName (char40) S | Comment (char100) 1st 10 - M, rest - S |
| | | | | | |
| | | | | | |
| | | | | | |

FIG. 9

COMMITMENT CONTROL FOR LESS THAN AN ENTIRE RECORD IN AN IN-MEMORY DATABASE IN A PARALLEL COMPUTER SYSTEM

CROSS-REFERENCE TO RELATED APPLICATION

This patent application is related to a patent application entitled "INSERTING DATA INTO AN IN-MEMORY DISTRIBUTED NODAL DATABASE", U.S. Ser. No. 11/861,343 filed on Sep. 26, 2007, which is incorporated herein by reference.

BACKGROUND

1. Technical Field

This disclosure generally relates to database systems, and more specifically relates to ways of speeding up commitment control in an in-memory database in a parallel computer system.

2. Background Art

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Some computer systems provide a large number of compute nodes that function in parallel. IBM has developed such parallel computer systems. One is known as BlueGene, another is known as Roadrunner. Parallel computer systems may have a large number of nodes, each with its own processor and memory. This characteristic provides the opportunity to provide an in-memory database, where some portions of the database, or the entire database resides completely in memory. An in-memory database provides an extremely fast response time for searches or queries of the database when all works as expected.

Database tables may be split up and distributed across several nodes in an in-memory database in a parallel computer system. If one of the nodes that contains information that is needed for a transaction stops working or becomes so busy that its latency becomes excessive, the performance of processing transactions on the in-memory database can be severely reduced. In essence, the slowest node that contains needed information becomes the bottleneck that limits the speed of the transaction. Without a way to speed up the performance of commitment control in an in-memory database, prior art parallel computer systems with in-memory databases will continue to be plagued by the bottleneck described above.

BRIEF SUMMARY

In a networked computer system that includes multiple interconnected nodes, a commitment control mechanism allows designating certain portions of a record in an in-memory database as mandatory and other portions of the record as secondary, and performs mandatory commitment control once all the mandatory portions are available even if one or more secondary portions are not yet available. The secondary portions may be under separate commitment control that is asynchronous to the commitment control for the mandatory portions, or may be under no commitment control at all. The result is a commitment control mechanism that performs commitment control for portions of a record that are marked mandatory even when one or more of the portions marked secondary are not available.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

Computer systems have been developed that include multiple nodes coupled to each other via one or more networks. The BlueGene supercomputer family developed by IBM includes thousands of compute nodes coupled together via networks. The Roadrunner supercomputer family developed by IBM also includes thousands of compute nodes coupled together via networks. These parallel computer system are well-suited to implementing in-memory databases.

The claims and disclosure herein provide a commitment control mechanism for an in-memory database in a parallel computer system that performs commitment control of portions of a database record that are marked as mandatory regardless of whether or not all the portions of the database record that are marked secondary are available or not. The secondary portions of the database record may be under separate commitment control that is asynchronous to the commitment control for the mandatory portions, or may be under no commitment control at all. By marking portions of a database record as mandatory and secondary, the commitment control for the mandatory portions is not slowed down waiting for the secondary portions to be available, and is not prevented if any nodes that contain any secondary portions stop functioning correctly. As a result, commitment control for the mandatory portions does not rely on the secondary portions being available, thereby enhancing the speed and reliability of the in-memory database in a parallel computer system.

Figure 1:
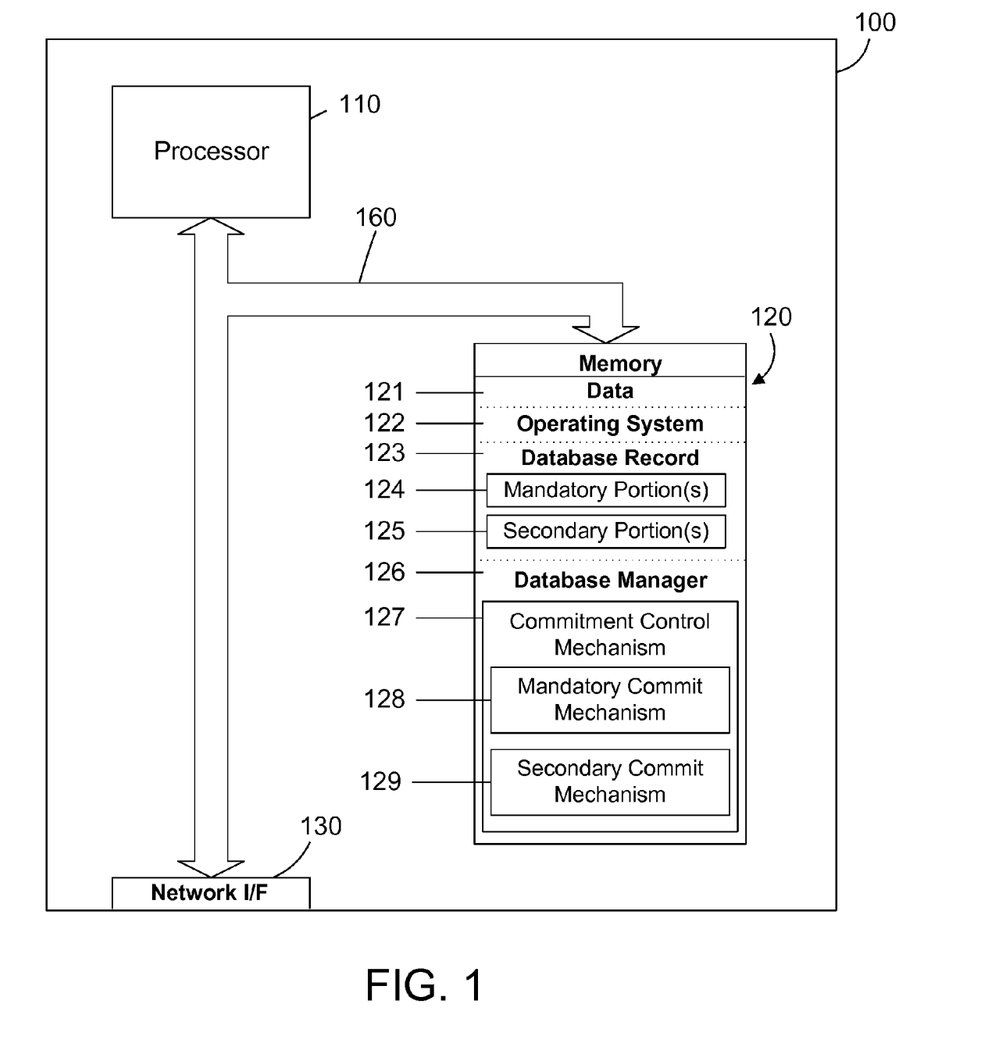
FIG. 1 is a block diagram of one possible configuration for a node in a networked computer system that includes a commitment control mechanism that performs commitment control of mandatory portions of a database record even when one or more secondary portions of the database record are not available.

Referring to FIG. 1, a computer system 100 is one suitable implementation of a computer system that may be a node in a networked computer system that interconnects multiple nodes via one or more networks, and includes a commitment control mechanism that can perform commitment control for mandatory portions of a database record regardless of whether the secondary portions are available or not. The node 100 preferably includes one or more processors 110, memory 120, and a network interface 130. Node 100 could be a node in a BlueGene computer system, in a Roadrunner computer system, or in any other parallel computer system, whether currently known or developed in the future. Those skilled in the art will appreciate that the disclosure herein applies equally to any computer system that may perform cooperative processing with other computer systems, regardless of whether the computer system is a complicated multi-user computing apparatus, a single user workstation, an embedded control system, or a massively parallel computer system such as BlueGene or Roadrunner developed by IBM.

As shown in FIG. 1, the processor(s) 110, memory 120 and network interface 130 are interconnected through the use of a system bus 160. Memory 120 preferably contains data 121, an operating system 122, a database record 123, and a database manager 126. Data 121 represents any data that serves as input to or output from any program in node 100. Operating system 122 is a multitasking operating system such as Linux [Correct?]; however, those skilled in the art will appreciate that the spirit and scope of this disclosure is not limited to any one operating system. The operating system 122 may be a full-blown workstation operating system such as Windows XP, or may be a much smaller operating system kernel for a parallel computer that does not include all the functionality for workstations. Windows XP is a registered trademark of Microsoft Corporation.

Figure 3:
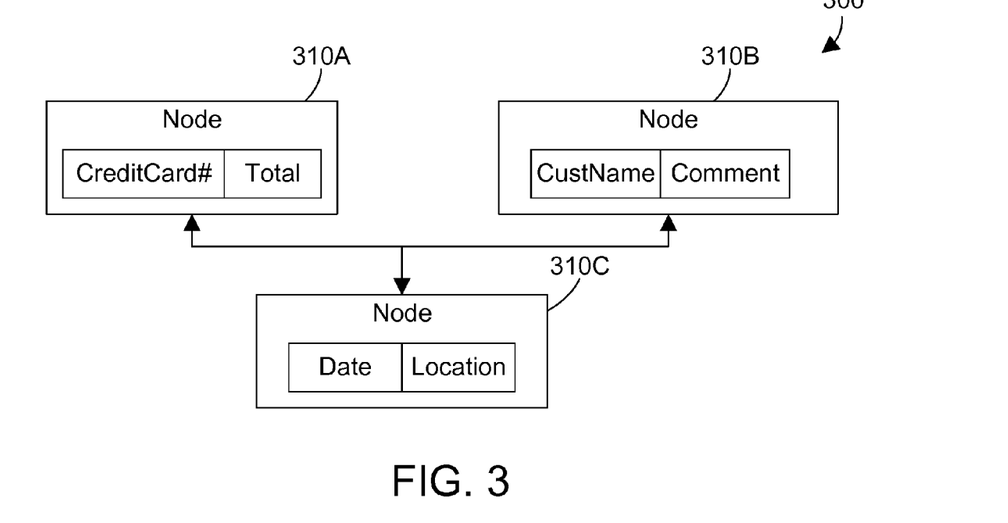
FIG. 3 is a block diagram of a prior art parallel computer system showing an in-memory database with the table in FIG. 2 distributed across three nodes.

Database record 123 represents an entry or row in a database table that defines fields or columns, and includes one or more mandatory portions 124 and one or more secondary portions 125. While database record 123 is shown in memory 120 in FIG. 1 for the sake of convenience, in reality different portions of the database record 123 may be allocated to different nodes in a parallel computer system, as shown in FIG. 3. The database manager 126 includes a commitment control mechanism 127 that commits transactions to a database. The commitment control mechanism 127 includes a mandatory commit mechanism 128 that performs commitment control once all of the mandatory portions 124 of a database record 123 are available, regardless of whether one or more of the secondary portions 125 are available or not. The secondary commit mechanism 129 is optional, and is present if commitment control of the secondary portions 125 is desired. Note that secondary commit mechanism 129 functions asynchronously with respect to the mandatory commit mechanism 128, which means the secondary commit mechanism 129 may perform a commit of the secondary portions 125 anytime after the mandatory commit mechanism 128 performs a commit of the mandatory portions 124. Note that database manager 126 could reside in any node in a parallel computer system or in any computer system coupled to the parallel computer system.

Node 100 may use well known virtual addressing mechanisms that allow the programs of node 100 to behave as if they only have access to a large, single storage entity instead of access to multiple, smaller storage entities such as memory 120. Therefore, while data 121, operating system 122, database record 123, and database manager 126 are shown to reside in memory 120, those skilled in the art will recognize that these items are not necessarily all completely contained in memory 120 at the same time. It should also be noted that the term "memory" is used herein generically to refer to the entire virtual memory of node 100, and may include the virtual memory of other nodes coupled to node 100.

Processor 110 may be constructed from one or more microprocessors and/or integrated circuits. Processor 110 executes program instructions stored in memory 120. Memory 120 stores programs and data that processor 110 may access. When node 100 starts up, processor 110 initially executes the program instructions that make up operating system 122.

Although node 100 is shown to contain only a single processor and a single system bus, those skilled in the art will appreciate that a database manager that includes a mandatory commit mechanism may be practiced using a computer system that has multiple processors and/or multiple buses. In addition, interfaces that are used (such as network interface 130) may each include separate, fully programmed microprocessors that are used to off-load compute-intensive processing from processor 110. However, those skilled in the art will appreciate that these functions may be performed using I/O adapters as well.

Network interface 130 is used to connect node 100 to other nodes and computer systems. Depending on the specific architecture of the parallel computer system, multiple network interfaces may be used to interconnect the multiple nodes on the parallel computer system with each other via different networks. Network interface 130 is preferably coupled to other nodes via a network. Network interface 130 coupled to a network broadly represent any suitable way to interconnect electronic devices, regardless of whether the network comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol. Node 100 may also include other interfaces and functions as are well-known in the art, such as a keyboard interface, a mouse interface, an audio interface, a display interface, and a bulk storage interface.

At this point, it is important to note that while the description above is in the context of a fully functional computer system, those skilled in the art will appreciate that the commitment control mechanism may be distributed as an article of manufacture in a variety of forms, and the claims extend to all suitable types of computer-readable media used to actually carry out the distribution, including recordable media such as memory 120, floppy disks and CD-RW (e.g., 195 of FIG. 1).

The commitment control mechanism herein may also be delivered as part of a service engagement with a client corporation, nonprofit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
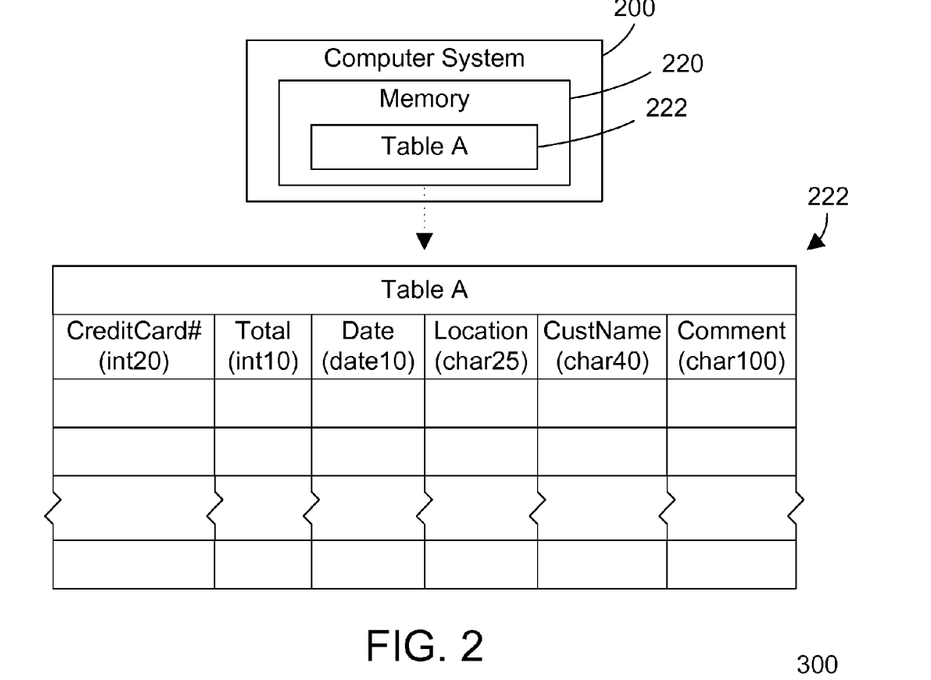
FIG. 2 is a block diagram of a prior art computer system that includes a sample table in memory.

Referring to FIG. 2, a sample computer system 200 is shown to include memory 220 that contains a table 222. Computer system 200 is the most common example of database systems known in the art, where an entire database table resides in the memory of a single computer system. For the sake of illustration, details of one suitable implementation for table 222 are shown in FIG. 2. For this specific example, table 222 includes the following columns: CreditCard#, Total, Date, Location, CustName and Comment. Note the data type of each column is shown in FIG. 2. Thus, CreditCard# is an integer with a length of 20; Total is an integer with a length of 10; Date is a date field with a length of 10; location is a text (or character) field with a length of 25; CustName is a text field with a length of 40; and Comment is a text field with a length of 100. Note the particular structure of table 222 shown in FIG. 2 is shown as an example for the sake of illustration, and does not represent any known database table.

With the development of parallel computer systems, developers recognized that a database table could be spread across multiple nodes. The split may be done at row boundaries. For example, the first 1000 rows could be on one node; the next 1000 rows on a different node, etc. However, a split at column boundaries may be even more useful. For example, if table 222 in FIG. 2 were split among three nodes 310A, 310B and 310C in a parallel computer system 300 as shown in FIG. 3, the efficiencies of executing queries to the distributed table may be increased. For example, if a query is made to the distributed table in FIG. 3 for the total amount of a transaction, only node 310A needs to execute the query, because only node 310A has the Total column. Because nodes 310B and 310C do not have the Total column, they may ignore the query. In this manner, a distributed in-memory database in a parallel computer system may provide performance advantages when compared with executing a query against a table that is all contained in the same memory as shown in FIG. 2.

Splitting up columns of a table across multiple nodes as shown in FIG. 3 creates potential performance advantages as discussed above, but is not without risk or drawbacks. For example, if a table is split as shown in FIG. 3, and if a transaction is run to insert a new record into the table, all three nodes 310A, 310B and 310C must have their data available before a commit cycle may be performed to commit the transaction. If one of the nodes has much higher loading than the other two nodes, the highly-loaded node may be slow to respond. Because the data in all fields of a record must be available before a commit cycle is done in the prior art, the speed of performing a commit cycle for a record distributed across multiple nodes is governed by the speed of the slowest node. In addition, if one of the nodes stops working, the commit cycle cannot be completed.

Figure 4:
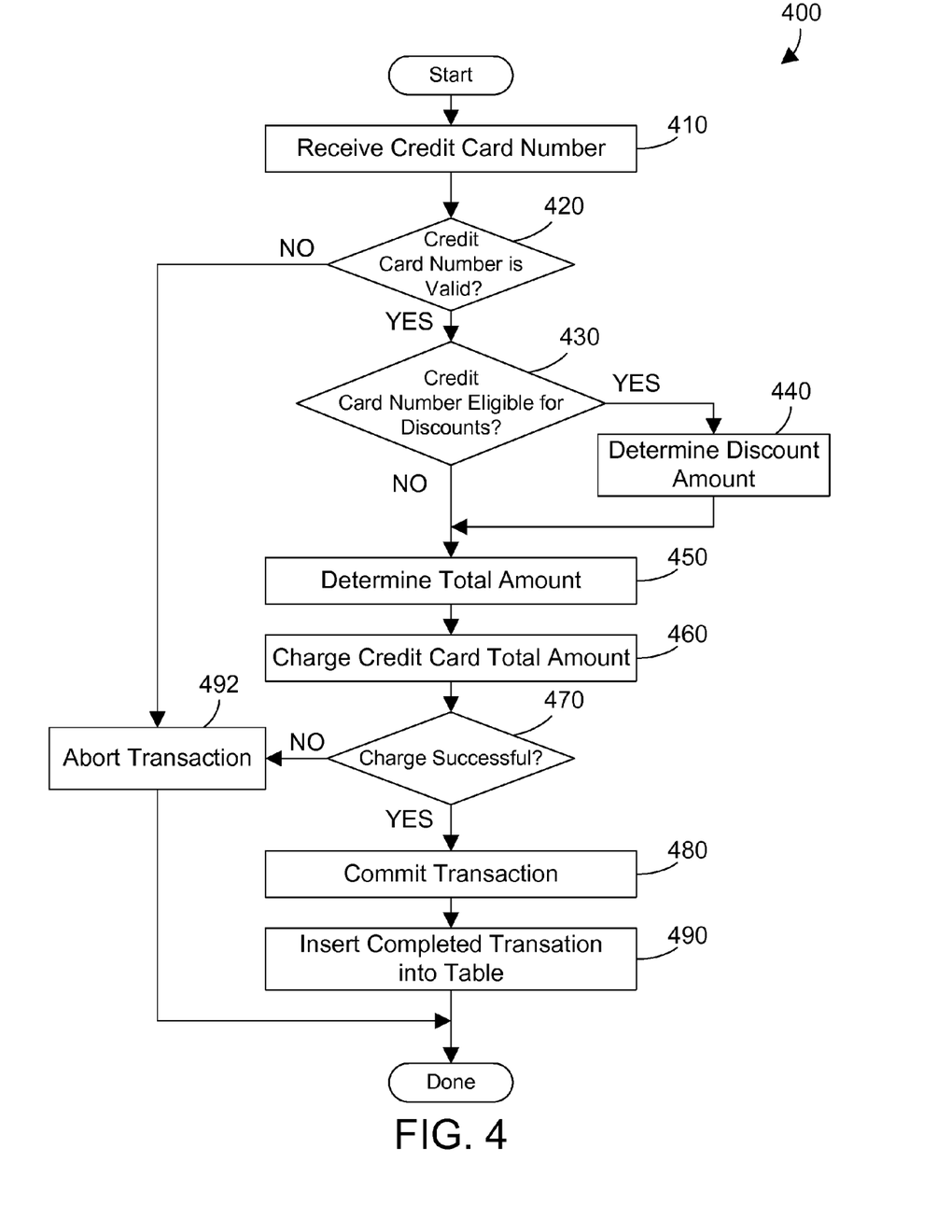
FIG. 4 is a flow diagram of a sample transaction.

Referring to FIG. 4, a sample transaction is shown as a method 400 for the purpose of illustrating the concepts herein. We assume method 400 is performed when a user at an e-commerce website enters a credit card number and selects to make a purchase using the credit card number. The credit card number is received (step 410). Method 400 then checks to see if the credit card number is valid (step 420). If not (step 420=NO), the transaction is aborted (step 492). If the credit card number is valid (step 420=YES), a check is made to see if the credit card number is eligible for discounts (step 430). If so (step 430=YES), the amount of the discount is determined (step 440). If the credit card number is not eligible for a discount (step 430=NO), no discount is applied. The total amount is then determined (step 450), and the total amount is charged to the credit card (step 460). If the charge is not successful (step 470=NO), the transaction is aborted (step 492). If the charge is successful (step 470=YES), the transaction is committed (step 480), resulting in a completed transaction being inserted into the table (step 490).

In traditional database systems, a transaction may be commenced by creating a new record. As the transaction progresses, data in the record may be added or changed at various steps in the transaction. Once all the data needed for the transaction is available in the record, the data in the record may be committed, resulting in the finalization of the record. If the transaction fails before the commit cycle, changes to the record may be rolled back so the database is not affected by the failed transaction. We assume for the example in FIG. 4 that data is inserted into various columns in the record in steps 410-470, and the commit cycle in step 480 is performed once all the data in the record is available.

Figure 5:
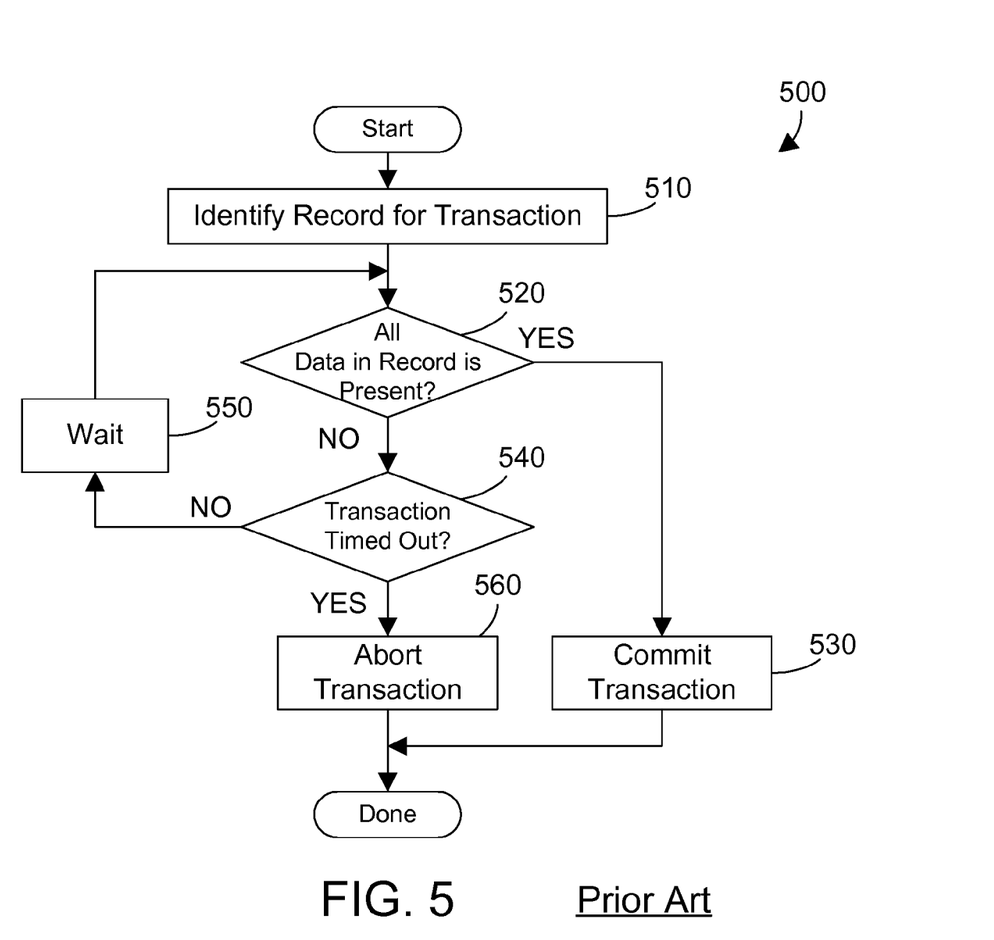
FIG. 5 is a flow diagram of a prior art method for commitment control in a database system.

Referring to FIG. 5, a prior art method 500 for commitment control is shown. First, a record for a transaction is identified (step 510). The record may be an existing record in a database table, or may be a new record for a database table that is constructed as the transaction proceeds. Once all data in the record is present (step 520=YES), the transaction is committed (step 530), and method 500 is done. If not all data in the record is present (step 520=NO), a check is made to see if the transaction has timed out (step 540). Many database systems have a timer that is used to time out a transaction if it is pending for too long so the transaction is not left pending even though it may not be completed due to a failure. If the transaction has not timed out (step 540=NO), method 500 waits (step 550) and returns to step 520. If the transaction times out (step 540=YES), the transaction is aborted (step 560), and method 500 is done. We see from FIG. 5 that the prior art method for commitment control waits until all data in the record for the transaction is present (or available) (step 520=YES) before committing the transaction (step 530).

Figure 6:
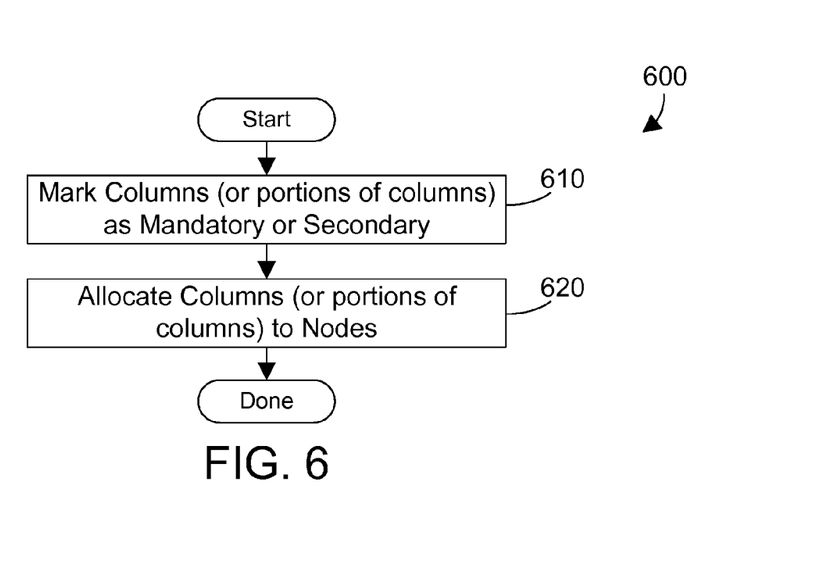
FIG. 6 is a flow diagram of a method for setting up separate commitment control for mandatory and secondary portions of a database record.
Figure 7:
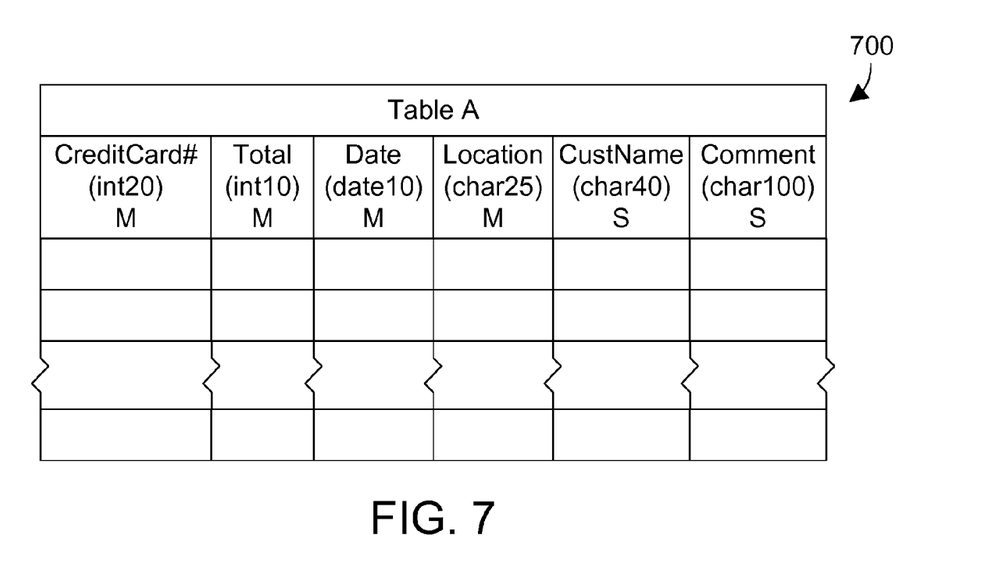
FIG. 7 is the sample database table in FIG. 2 with the addition of flags to indicate which columns are mandatory and which columns are secondary.

The disclosure and claims herein recognize that some data in the record may be critical to a transaction, while other data in the record may not. As a result, it is possible to define some portions of the record as "mandatory" and other portions as "secondary." The mandatory portions are those that are critical to a transaction, while the secondary portions are those that are not critical to the transaction. A method 600 shown in FIG. 6 marks fields or portions of fields in a record as mandatory or secondary (step 610). For example, we assume the CreditCard#, Total, Date and Location columns in table 222 in FIG. 2 are mandatory, while the CustName and Comment columns are secondary. These columns may be marked as mandatory or secondary using any suitable method. One suitable method includes a flag for each column in metadata for the table that specifies whether the column is mandatory or secondary. FIG. 7 shows a table 700 that is table 222 in FIG. 2 with the addition of flags "M" and "S" that denote whether each column is mandatory (M) or secondary (S).

Once the columns of a record are marked as mandatory and secondary, the columns may be strategically allocated to nodes in a parallel computer system (step 620). For example, FIG. 3 shows the mandatory columns in node 310A and 310C, while the secondary columns are in node 310B. By marking the columns first as mandatory and secondary, the database administrator may then make intelligent decisions regarding which columns reside in which nodes.

With certain portions marked mandatory and other portions marked secondary as shown in FIG. 7, and with the allocation of portions of a record across multiple nodes based on these markings as shown in FIG. 3, it is now possible to perform commitment control when the mandatory portions are available even when one or more secondary portions are not available. This is shown in method 800 in FIG. 8. First, the mandatory portions for a transaction are identified (step 810). While the record is defined with mandatory portions and secondary portions, not all mandatory portions of the record may be required to perform a particular transaction. Thus, step 810 identified which mandatory portions are required for the transaction that needs to be performed. If data in all the mandatory portions identified in step 810 are present in the record (step 820=YES), the mandatory portions are committed (step 840), without regard to whether or not all the secondary portions are available. While all data in the required mandatory portions are not present (step 820=NO), method 800 loops from 822=NO to wait (step 824) back to step 820 awaiting the mandatory data, unless the transaction times out (step 822=YES), and which point the transaction is aborted (step 830) and method 800 is done.

Figure 8:
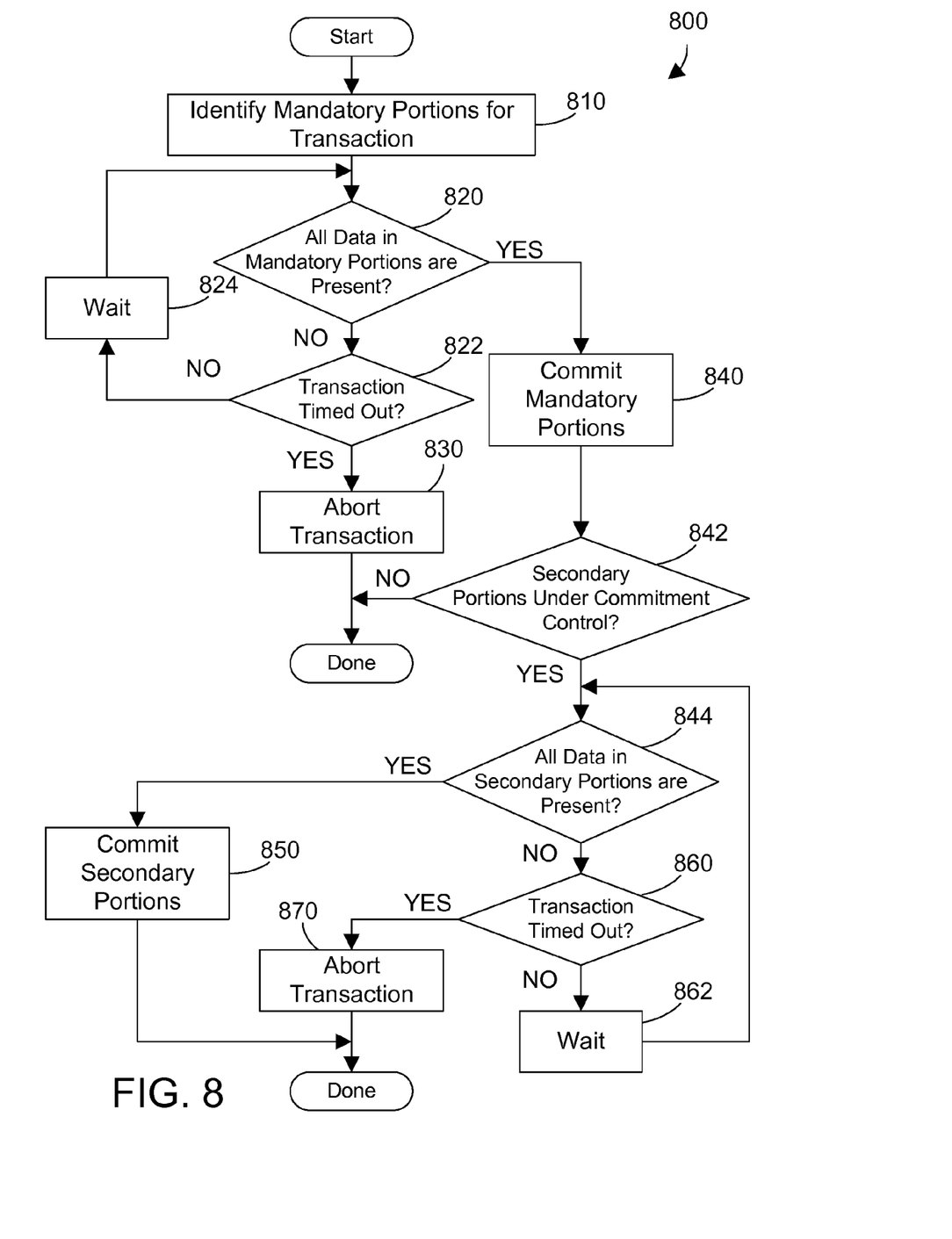
FIG. 8 is a flow diagram of a method for performing commitment control for mandatory portions of a database record even when one or more secondary portions of the database record are not available.

Note step 840 in method 800 is performed to commit the mandatory portions even when one or more secondary portions are not available. The commitment of the mandatory portions is preferably performed by mandatory commit mechanism 128 in FIG. 1. Note the secondary portions may be under separate commitment control as well, but the commitment control for the secondary portions is optional. Thus, after the mandatory portions are committed in step 840, if the secondary portions are not under commitment control (step 842=NO), method 800 is done. If, however, the secondary portions are under commitment control (step 842=YES), method 800 waits until all data in the secondary portions are present (step 844=YES), at which time the secondary portions may be committed (step 850). While waiting for the secondary portions to be available (step 844=NO), a check is made to see if the transaction has timed out (step 860). If so (step 860=YES), the transaction is aborted (step 870) and method 800 is done. If the transaction has not timed out (step 860=NO), method 800 waits (step 862) and loops back to step 844. The commitment of the secondary portions in step 850 is preferably performed by secondary commit mechanism 129 in FIG. 1. Note the commit cycles of the mandatory portions in step 840 and the secondary portions in step 850 are preferably asynchronous to each other, and do not depend on each other. In addition, it is equally within the scope of the disclosure and claims herein to provide a parallel monitoring of the mandatory portions and secondary portions of a record, where commitment control for the secondary portions could occur before the commitment control for the mandatory portions. When the secondary portions are under commitment control, the mandatory and secondary commit cycles may be linked to facilitate the journaling of transactions. Replication tools that use journals can either ignore, delay or put together in real time the results of the linked mandatory and secondary commit cycles. This allows replication tools the added advantage of speeding up the necessary work first. Multiple log files could also be used, one for mandatory data and another for secondary data.

Figure 9:
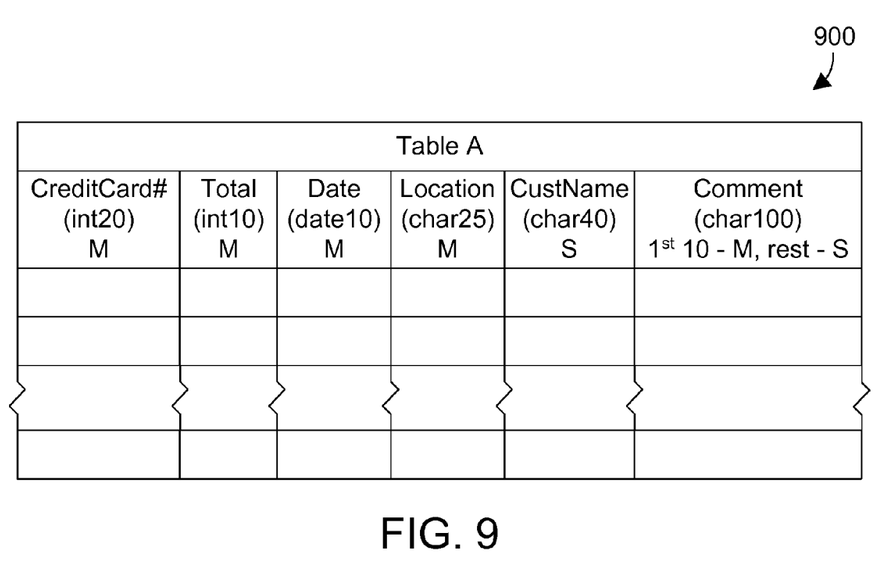
FIG. 9 is the sample database table in FIG. 2 with the addition of flags to indicate mandatory and secondary portions, showing the Comment column being split with the first ten characters being mandatory and the rest being secondary to illustrate that any suitable portion of a column can be defined as mandatory or secondary.

The example in FIG. 7 assumes columns in a database record are defined as mandatory or secondary on a column boundary. Thus, each column marked mandatory is all mandatory, and each column marked secondary is all secondary. Note, however, that the scope of the disclosure and claims herein expressly extend to marking portions of a record as mandatory and secondary in a way that crosses column boundaries. For example, table 900 in FIG. 9 shows the first four columns are mandatory and the fifth column is secondary, the same as in table 700 in FIG. 7. Note, however, the last column Comment is defined so the first ten characters are mandatory, and the remaining 90 characters of the Comment column are secondary. For example, it may be custom practice for database entry operators to put the customer's telephone number in the first ten characters of the Comment column. In this manner, any suitable portion of a database record may be defined as mandatory or secondary, without regard to column boundaries.

By defining portions of a database record as mandatory, then doing commitment control when all mandatory portions of the record are available during a transaction and when at least one secondary portion is not available, the speed for performing transactions is improved. For example, if the columns are defined mandatory and secondary as shown in FIG. 7, and are distributed across three nodes as shown in FIG. 3, a transaction could commit the mandatory portions even if node 310B becomes unresponsive. In addition, a transaction could commit once all the information in nodes 310A and 310C for the selected record are available, and a separate commit cycle could then be run when the secondary portions are all available.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. A parallel computer system comprising:
a plurality of nodes coupled together, each node including at least one processor and memory;
an in-memory database residing in the plurality of nodes, the in-memory database defining a record that includes at least one mandatory portion that must be present for a change to the record to commit and at least one secondary portion that need not be present for a change to the record to commit;
a database manager residing in a memory, the database manager comprising:
a mandatory commit mechanism that commits changes to the at least one mandatory portion of the record when all mandatory portions of the record are available during a transaction and when at least one secondary portion is not available.

2. The parallel computer system of claim 1 further comprising a secondary commit mechanism that functions asynchronously with respect to the mandatory commit mechanism, the secondary commit mechanism committing changes to the at least one secondary portion of the record when all secondary portions of the record are available during the transaction.

3. The parallel computer system of claim 2 wherein the secondary commit mechanism commits the changes to the at least one secondary portion of the record after the mandatory commit mechanism commits the changes to the at least one mandatory portion of the record.

4. The parallel computer system of claim 1 wherein each mandatory portion is defined on a column boundary in the record.

5. The parallel computer system of claim 1 wherein a first mandatory portion and a first secondary portion are defined in a same column in the record.

6. A computer-implemented method for commitment control for an in-memory database in a parallel computer system, the method comprising the steps of:
- (A) defining at least one portion of a record in the in-memory database as mandatory that must be present for a change to the record to commit;
- (B) defining at least one portion of the record as secondary that need not be present for a change to the record to commit;
- (C) allocating portions of the record to a plurality of nodes in the parallel computer system;
- (D) monitoring mandatory portions of the record during a transaction; and
- (E) when all mandatory portions of the record are available during the transaction and at least one secondary portion is not available, committing changes to all mandatory portions of the record.

7. The method of claim 6 further comprising the steps of:
- (F) committing changes to all secondary portions of the record when all secondary portions of the record are available during the transaction, wherein the committing changes to all secondary portions of the record is done in a commit cycle that is separate and asynchronous to the commit cycle for the mandatory portions of the record in step (E).

8. The method of claim 7 wherein the committing of changes to all secondary portions in step (F) is performed after the committing of changes to all mandatory portions in step (E).

9. The method of claim 6 wherein each mandatory portion is defined on a column boundary in the record.

10. The method of claim 6 wherein a first mandatory portion and a first secondary portion are defined in a same column in the record.

11. A method for deploying computing infrastructure, comprising integrating computer readable code into a computing system, wherein the code in combination with the computing system perform the method of claim 6.

12. A computer-implemented method for commitment control for an in-memory database in a parallel computer system, the method comprising the steps of:
- (A) marking at least one portion of a record in the in-memory database as mandatory that must be present for a change to the record to commit;
- (B) marking at least one portion of the record as secondary that need not be present for a change to the record to commit;
- (C) allocating portions of the record to a plurality of nodes in the parallel computer system;
- (D) starting a transaction to the record in the in-memory database;
- (E) monitoring all mandatory portions of the record during the transaction;
- (F) when all mandatory portions of the record are available during the transaction and at least one secondary portion is not available and the transaction has not timed out, committing changes to the mandatory portions of the record;
- (G) after performing step (F), committing changes to all secondary portions of the record when all secondary portions of the record are available during the transaction and the transaction has not timed out, wherein the committing changes to all secondary portions of the record is done in a commit cycle that is separate and asynchronous to the commit cycle for the mandatory portions of the record in step (F).

13. The method of claim 12 wherein each mandatory portion is defined on a column boundary in the record.

14. The method of claim 12 wherein a first mandatory portion and a first secondary portion are defined in a same column in the record.

15. A computer-readable article of manufacture comprising:
- a database manager comprising a mandatory commit mechanism that monitors during a transaction a record that includes at least one mandatory portion that must be present for a change to the record to commit and at least one secondary portion that need not be present for a change to the record to commit, the database manager committing changes to at least one mandatory portion of the record when all mandatory portions of the record are available during the transaction and when at least one secondary portion is not available; and
- recordable media bearing the database manager.

16. The article of manufacture of claim 15 wherein the database manager further comprises a secondary commit mechanism that functions asynchronously with respect to the mandatory commit mechanism, the secondary commit mechanism committing changes to the at least one secondary portion of the record when all secondary portions of the record are available during the transaction.

17. The article of manufacture of claim 16 wherein the secondary commit mechanism commits the changes to the at least one secondary portion of the record after the mandatory commit mechanism commits the changes to the at least one mandatory portion of the record.

18. The article of manufacture of claim 15 wherein each mandatory portion is defined on a column boundary in the record.

19. The article of manufacture of claim 15 wherein a first mandatory portion and a first secondary portion are defined in a same column in the record.

* * * * *